Oct. 18, 1932.  A. STOLL  1,883,068
COUPLED NUT AND WASHER ASSEMBLY
Filed Sept. 13, 1930

INVENTOR.
ALBERT STOLL
BY
ATTORNEY

Patented Oct. 18, 1932

1,883,068

UNITED STATES PATENT OFFICE

ALBERT STOLL, OF DETROIT, MICHIGAN, ASSIGNOR TO NATIONAL MACHINE PRODUCTS COMPANY, OF DETROIT, MICHIGAN, A CORPORATION OF MICHIGAN

COUPLED NUT AND WASHER ASSEMBLY

Application filed September 13, 1930. Serial No. 481,769.

This invention relates to fastening devices of the type in which a washer is coupled to a nut.

Briefly stated, the invention forming the subject of this application looks to the provision of expeditious means by which a split washer may be coupled to a nut to allow these parts to be handled as a unit, the coupling means embodying an annular skirt or protuberance of the nut internally threaded along with the bore of the nut to affect an increase in the length of the threaded bore without a corresponding increase in the height of the nut, it being observed that the construction of the washer and the manner of coupling the same to the nut permits the threading of the nut and the extension thereof before the washer is attached to the nut in consequence of which last mentioned feature it is possible to employ standard nut making and threading equipment and materially increased cost of the nut and washer as a result of the coupling arrangement avoided.

Another feature of the invention will be found to reside in the fact that the skirt of the nut is not only caused to function as a coupling means but as a means to expand the washer radially preparatory to slipping the same over the skirt, this second purpose of the skirt having been found to greatly facilitate the coupling operation.

Additional advances marked by the invention will appear as the description proceeds.

Figure 1:
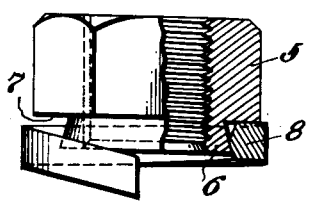
Figure 2:
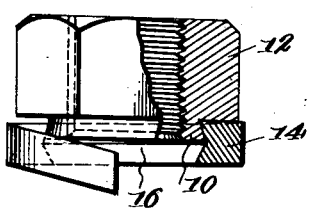
Figure 3:
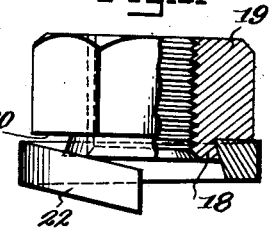
Figure 4:
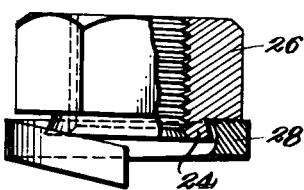
Figure 5:
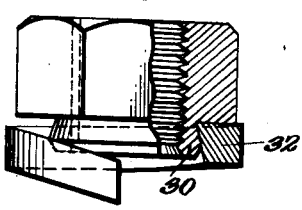
Figure 6:
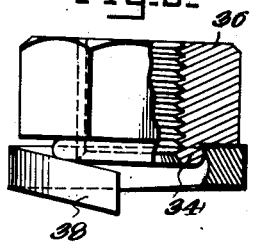
Figure 7:
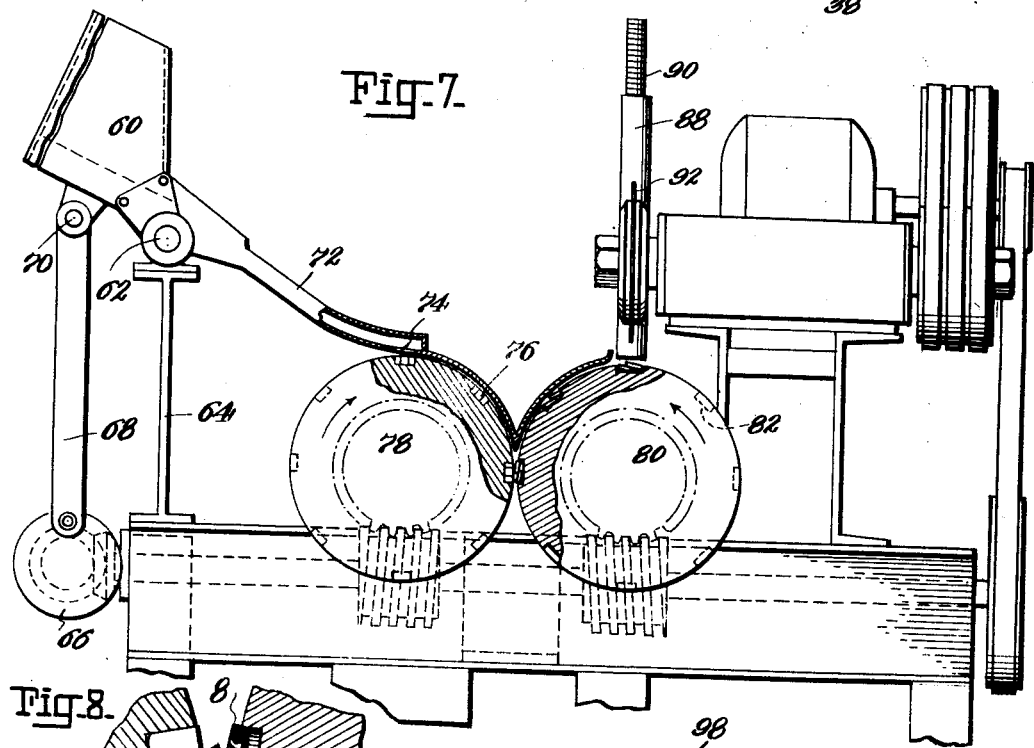
Figure 8:
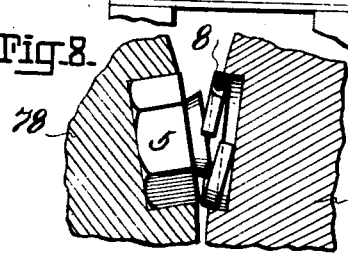
Figure 9:
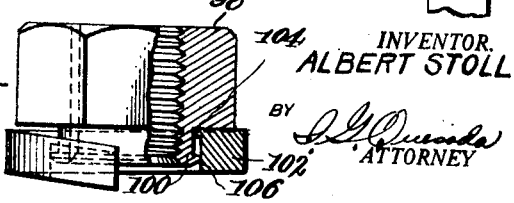

In the accompanying drawing forming a part of this application and in which like numerals are employed to designate like parts throughout the same, Figure 1 is a side elevation of a coupled nut and washer embodying the invention, parts being shown in section, Figure 2 is a similar view illustrating a modification, Figure 3 is a like view disclosing a further modification, Figure 4 is a similar view illustrating another expression of the invention, Figure 5 is a similar view disclosing another variation of the invention, Figure 6 is also a side elevation of a coupled nut and washer with parts broken away and shown in section to disclose a still further modification, Figure 7 is a fragmentary side elevation illustrating a mechanism for coupling the washers and nuts, the view also illustrating a means by which washers may be made, Figure 8 is a detail sectional view illustrating the manner in which the washers and the nuts are brought to a tangency preparatory to the coupling of the same, Figure 9 is a fragmentary side elevation illustrating another modification of the invention, parts being broken away.

In the drawing, and more particularly Figure 1 thereof, the numeral 5 designates a hexagonal or other polygonal nut having the bore thereof threaded for connection of the nut with a bolt, a stud or the like. The nut 5 and more particularly the base thereof is provided with an annular concentric skirt or protuberance 6 having the same internal diameter as the bore of the nut and threaded along with the bore of the nut to provide an increase in the length of the thread of the nut so that the possibility of stripping the threads of either the nut or the mating fastener or both of these elements as a result of wrench pressure is reduced.

Figure 1 illustrates that the annular skirt 6 is spaced inward from the sides of the nut to cooperate with the base of the nut in the formation of an external annular groove 7. In carrying out the invention, the annular skirt 6 is externally flared from the base of the nut to the lower extremity of the skirt causing the external groove 7 to deepen radially in the direction of the crown of the nut.

The skirt 6, in addition to increasing the length of the thread through the nut, constitutes a means by which a split helical spring washer 8 may be coupled to the nut to allow these parts to be handled as a unit. In more specifically adverting to this second function of the skirt 6 it is pointed out that the inner wall of the washer 8 is bevelled or otherwise divided into oppositely inclined contact faces meeting at the medial line of the inner wall of the washer. The inner contact faces of the washer 8 are disposed in intersecting planes and either of these faces may be engaged with the flared skirt 6 to hold the washer firmly in place. By bevelling the inner wall of the washer 8 from the medial line thereof the contact face closer to the base of the nut constitutes a sort of cam by which the movement of the skirt through the washer during the coupling operation is aided.

Since the angularly disposed or bevelled faces of the washer 8 are inclined on an angle corresponding to the angle of the outer wall of the skirt 6, the random application of the washer to the nut is permitted. In other words, it is not necessary to present a particular face of the washer to the nut preparatory to the coupling operation.

In the form of the invention illustrated in Figure 2, the internally threaded concentric annular skirt 10 of the nut 12 is externally flared and is adapted to be embraced by a split helical spring washer 14. The inner peripheral wall of the washer 14 is formed with a circumferential groove 16 substantially V-shaped in cross section to define a pair of angularly disposed faces arranged in intersecting planes and meeting approximately at the medial line of the inner wall of the washer.

The angles of the faces of the grooved inner wall of the washer 14 correspond approximately to the angle of the outer wall of the skirt 10 so that when the washer is coupled to the nut, the outer wall of the skirt will be more or less flatly engaged by the opposed face of the grooved inner wall of the washer. This arrangement allows the washer to be applied from either side thereof to the skirt 10. Thus, preparatory to the coupling operation it is not necessary to present a particular face of the washer to the nut. Also, the arrangement disclosed in Figure 2 provides a maximum area of contact between the washer 14 and the surfaces between which the washer is clamped. That is to say, the washer is increased in wall thickness toward the bearing faces thereof to provide maximum contact areas.

In the form of invention illustrated in Figure 3, the annular internally threaded concentric skirt 18 extending from the base of the nut 19 is externally flared causing the outer wall thereof to cooperate with the base of the nut in the formation of an external annular groove 20 deepened radially toward the crown of the nut and receiving a portion of a helical split longitudinally compressible washer 22. More specifically, the skirt 18 is flared from the base of the nut to the lower extremity of the skirt on an angle corresponding to the angle of the inner face of the washer 22 so that when the washer is applied, the opposed faces of the washer and the skirt will be flatly in contact with each other as nearly so.

In the form of invention illustrated in Figure 4, the annular concentrically located internally threaded and externally flared extension 24 of the nut 26 has an interlocking engagement with the surrounding helical split spring washer 28. More specifically, the inner wall of the washer 28 is shown to be circumferentially grooved with the bottom wall or surface of such groove curved on an arc and extending to the opposite contact or bearing faces of the washer. By grooving the inner circumferential wall of the washer 28 on a curved line, the washer may be applied from either side thereof to the skirt. That is to say, it is not necessary to present a particular side of the washer to the nut as a preliminary to the coupling operation.

In the form of invention shown in Figure 5, the annular internally threaded concentrically located skirt 30 extending from the base of the nut is externally flared from the base of the nut to a point spaced rearwardly of the forward extremity of the skirt and is chamfered or bevelled from the forward extremity of the flared portion to the forward end of the skirt to define a tapered section constituting a sort of wedge adapted to enter the space between the sides of the washer 32 and spread the washer radially preparatory to the coupling operation. The inner wall of the washer 32 is bevelled or inclined from opposite faces of the washer and on an angle corresponding substantially to the angle of the flared portion of the skirt so that when the washer is applied the opposed faces of the washer and the skirt will be flatly in contact or nearly so to hold the washer in place.

In Figure 6, the annular internally threaded concentrically located skirt 34 of the nut 36 has the washer contact wall thereof curved outward or rounded while the inner wall of the split helical washer 38 is formed with a circumferential groove having an arcuate wall adapting the washer for application from either side thereof to the nut. The rounded outer wall of the skirt 34 is in the arc of a smaller circle than the transversely curved inner wall of the washer so that the lower terminal portion of the skirt is decreased in external diameter and is caused to function as a sort of wedge during the coupling operation. Like in the form of invention shown in Figure 4, the groove in the inner peripheral wall of the washer opens out through the opposite impinging faces of the washer thereby forming upper and lower internal lips or flanges overhanging and interlocked with the externally beaded skirt.

In the form of invention illustrated in Figure 9, the nut 98 has a skirt 100 extended axially from the base thereof and forming a continuation of the bore of the nut. More specifically, the skirt 100 is concentric with the bore of the nut and is threaded along with the bore of the nut so that an increase in the thread length of the nut is accomplished without a corresponding increase in the height of the nut.

The skirt 100 is embraced by the single convolution of a longitudinally compressible split washer 102, the inner wall or face of the washer being provided with a rib 104 coacting with an external rib 106 on the outer terminal portion of the skirt in holding the washer in place. The outer surface of the external rib 106 is bevelled while what might be said to be the inner surface of the internal rib 104 is oppositely bevelled to provide a means by which the washer is expanded during the coupling of the same to the nut.

In all forms of the invention, the skirt of the nut is, as described in connection with the form of invention shown in Figure 1, provided with the same internal diameter as that of the bore of the nut and, since the inherently flexible split spring washer is slipped onto the outer side of the skirt it is possible to complete the nut, including the threading thereof, before the same is coupled to the washer. This makes it possible to employ standard nut making and threading equipment as distinguished from the possibility of applying an endless washer to an extension of the nut and then swedging the extension out into retaining engagement with the washer, after which, in this latter case, the nut and the skirt must be threaded.

In each form of invention, the maximum external diameter of the skirt is greater than the normal minimum internal diameter of the surrounding split spring washer so that the washer will remain firmly in place on the skirt.

It is important to observe that the mounting of the washer on the outer surface of the flared extension of the nut makes it possible to provide a washer of any desired outside diameter. That is to say, the coupling means does not in any way limit the outside diameter in which the washer may be made. For example, in the drawing the washer is shown to have an external diameter greater than the minimum outside diameter of the nut.

The mechanism shown in Figures 7 and 8 is for the purpose of assembling the nuts and washer and may embody a hopper 60 mounted on a horizontally disposed pivot element 62 which, in turn, is mounted on a standard 64. The hopper has connection with a crank 66 through the medium of a connecting rod 68, the upper end of the connecting rod being pivoted to the hopper as indicated at 70. Obviously, operation of the crank 66 will oscillate the hopper to agitate the nuts placed therein and thereby bring about the supply of the nuts to a downwardly inclined chute 72.

The nuts are conducted through the chute 72 with the skirts thereof uppermost or presented outwardly so that when the nuts are dropped singly through the feed opening 74 in the bottom of the chute and received within the polygonal shallow sockets 76 in the peripheral portion of a carrier 78, the skirts will be presented outward and extended beyond the periphery of the carrier.

The carrier 78 is in the nature of a driven disk that turns in the direction indicated to bring the nuts carried thereby into interlocking engagement with the washers carried by a second carrier 80. The washer carrier 80 is also in the nature of a driven disk and has the peripheral portion thereof provided with a plurality of uniformly spaced shallow sockets 82 into which the washers are fed singly.

The carriers 78 and 80 are preferably of the same diameter and operate at the same speed to bring the sockets 76 and 82 thereof successively into registration. When the sockets are thus brought into registration, the nuts and washers positioned therein are brought into coupled relation and upon being moved toward the lower sides of the disks are allowed to drop into a suitable receiver below. More specifically, the washers are presented to the nuts at an angle and are rolled or spread over the skirt 6 to permanently interlock these elements so that the same may be handled as a unit. In this connection, attention is invited to Figure 7 in which it is illustrated that, preparatory to the coupling operation, the skirt of the nut is positioned angularly between the sides of the washer and by the continued rotation of the disks, is caused to expand the washer radially so that the same will be slipped about the skirt to closely embrace the same. Thus, the skirt will be found to have the three following separate functions:

1. To constitute a means to permanently couple the split washer to the nut without at the same time limiting the diameter in which the washer may be made.

2. To provide a substantial increase in the length of the thread of the nut without a corresponding increase in the height of the nut.

3. To form a wedge or spreading device by which the washer is expanded radially for permanent application to the nut.

The washers may be carrier by a magazine 88 and presented singly to the sockets 82 in the carrier 80 located below. It might be added that, if desired, the washers may be made from a body of helically wound stock 90 positioned in the magazine and cut lengthwise by a cutting element 92 to provide separate aligned lock washers to be fed to the associated carrier 80.

Having thus described the invention, what is claimed is:

1. In an assembly of the class described, a nut having a skirt flared toward a point intermediate the ends thereof and having the forward terminal portion thereof reduced in external diameter to form a wedge, and a washer of split helical formation having an inner contact face overlapping the flared portion of said skirt and being inclined to correspond substantially to the inclination of the flared portion of the skirt, said wedge on the forward portion of the skirt constituting a means to spread the washer preparatory to coupling the same to the skirt.

2. In a structure of the class described, a screw-threaded body having a bearing surface and an annular concentric washer couping portion contiguous to the bearing surface, and a resilient lock washer embracing said coupling portion and having the outer edge thereof free, said washer and said coupling portion having means consisting of complemental faces on the coupling portion and the washer to permanently couple the washer to said threaded body to allow the washer and the threaded body to be handled as a unit, said coupling portion being reduced in external diameter from a point between the ends thereof toward the end of the coupling portion removed from said bearing surface to extend between and spread said washer during the coupling operation.

3. In a structure of the class described, a screw threaded body having a bearing surface and an annular washer coupling portion contiguous to the bearing surface, the end portion contiguous to the bearing surface, the end portion of said coupling portion remote from said bearing surface being formed with an abrupt diametrical enlargement forming an outwardly projecting shoulder, and a resilient lock washer embracing said coupling portion and having an internal shoulder confined between said first named shoulder and said bearing surface, the surface of said first named shoulder removed from said bearing surface being beveled to form a wedge adapted to engage said second named shoulder and expand the washer for application to the coupling portion.

4. In a structure of the class described, a screw threaded body having a bearing surface and an annular concentric washer coupling portion contiguous to the bearing surface and formed at the end removed from said bearing surface with an abrupt diametrical enlargement forming an outwardly projecting shoulder, and a resilient lock washer embracing said coupling portion and having an internal shoulder confined between said first named shoulder and said bearing surface, the outer surface of said first named shoulder and one surface of said second named shoulder being similarly beveled to form coacting cams expanding the washer for application to the coupling portion.

In testimony whereof I affix my signature.

ALBERT STOLL.

CERTIFICATE OF CORRECTION.

Patent No. 1,883,068.  October 18, 1932.

ALBERT STOLL.

It is hereby certified that error appears in the printed specification of the above numbered patent requiring correction as follows: Page 4, lines 33 and 34, claim 3, strike out the words and comma "the end portion contiguous to the hearing surface,"; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.

CERTIFICATE OF CORRECTION.

Patent No. 1,883,068.  October 18, 1932.

ALBERT STOLL.

It is hereby certified that in Certificate of Correction issued November 29, 1932, in the above numbered patent the word "hearing" in line 4, should read "bearing"; so that the said Certificate may conform to the records of the Patent Office.

Signed and sealed this 20th day of December A. D. 1932.

(Seal)

M. J. Moore,
Acting Commissioner of Patents.